United States Patent
Wang et al.

(10) Patent No.: US 12,205,354 B1
(45) Date of Patent: Jan. 21, 2025

(54) TRAINING METHOD FOR IMAGE RECOGNITION MODEL, SPINNERET PLATE DETECTION METHOD AND APPARATUS

(71) Applicant: ZHEJIANG HENGYI PETROCHEMICAL CO., LTD., Hangzhou (CN)

(72) Inventors: Peng Wang, Hangzhou (CN); Xiantao Peng, Hangzhou (CN); Yibo Qiu, Hangzhou (CN); Mingyi Liu, Hangzhou (CN); Dake Li, Hangzhou (CN); Dandan Wang, Hangzhou (CN); Jun Shen, Hangzhou (CN)

(73) Assignee: ZHEJIANG HENGYI PETROCHEMICAL CO., LTD., Hangzhou (CN)

( * ) Notice: Subject to any disclaimer, the term of this patent is extended or adjusted under 35 U.S.C. 154(b) by 0 days.

(21) Appl. No.: 18/776,004

(22) Filed: Jul. 17, 2024

(30) Foreign Application Priority Data

Nov. 21, 2023 (CN) .......................... 202311564507.5
Nov. 21, 2023 (CN) .......................... 202323147952.X

(51) Int. Cl.
*G06V 10/774* (2022.01)
*G06V 10/776* (2022.01)
*G06V 20/70* (2022.01)

(52) U.S. Cl.
CPC .......... *G06V 10/774* (2022.01); *G06V 10/776* (2022.01); *G06V 20/70* (2022.01)

(58) Field of Classification Search
CPC ..... G06V 10/774; G06V 10/776; G06V 20/70
See application file for complete search history.

(56) References Cited

U.S. PATENT DOCUMENTS

| 11,993,868 B1 * | 5/2024 | Peng ................ G05B 19/41875 |
| 2018/0225883 A1 * | 8/2018 | Kuwabara ............ G06V 10/757 |
| 2020/0250845 A1 | 8/2020 | Fukano et al. |

FOREIGN PATENT DOCUMENTS

| CN | 101819157 A | 9/2010 |
| CN | 111798449 A | 10/2020 |

(Continued)

OTHER PUBLICATIONS

Malassiotis, Sotiris, and Michael G. Strintzis. "Stereo vision system for precision dimensional inspection of 3D holes." Machine Vision and Applications 15 (2003): 101-113. (Year: 2003).*

(Continued)

*Primary Examiner* — Bobbak Safaipour
(74) *Attorney, Agent, or Firm* — EIP US LLP

(57) ABSTRACT

Provided is a training method for an image recognition model, a spinneret plate detection method, a spinneret plate detection device, and a storage medium, relating to the fields of image recognition and deep learning technologies. The training method includes: processing a spinneret plate sample image based on a first image recognition model to obtain annotation state information of each micro hole in the spinneret plate sample image, wherein the spinneret plate sample image is a projection image formed on an imaging member after light emitted by a light source passes through each micro hole of a spinneret plate sample and is amplified by an amplifying member, the annotation state information is used to characterize a shape state of a micro hole corresponding thereto; and training a preset image recognition model based on the spinneret plate sample image and the annotation state information to obtain a target image recognition model.

16 Claims, 3 Drawing Sheets

(56) References Cited

FOREIGN PATENT DOCUMENTS

| | | |
|---|---|---|
| CN | 112068215 A | 12/2020 |
| CN | 112730437 A | 4/2021 |
| CN | 113780469 A | 12/2021 |
| CN | 114004818 A | 2/2022 |
| CN | 114234796 A | 3/2022 |
| CN | 116128829 A | 5/2023 |
| CN | 116129348 A | 5/2023 |
| CN | 116228710 A | 6/2023 |
| CN | 116935368 A | 10/2023 |

OTHER PUBLICATIONS

Chinese Office Action dated Jan. 19, 2024 for Chinese Application No. CN 202311564507.5.

Pei Feng et al., "The study of the development of the spinneret automatic fine machine based on properties of mechanical materials", Applied Mechanics and Materials vol. 327 (2013) pp. 333-337, Engineering Research Center of Advanced Textile Machinery, Ministry of Education, Shanghai, P. R. China doi:10.4028/www.scientific.net/AMM.327.333, Jun. 30, 2023.

Cong He, "Intelligent Monitoring System for the Spinning Process of Carbon Fiber", Jan. 9, 2014.

Tan Zhiyin "Research on Automated Technologies of Inspecting and Machining Spinneret for Melt-Spun Nonwoven", Mar. 8, 2009.

Chinese Notification of Grant dated Feb. 7, 2024 for Chinese Application No. CN 202311564507.5.

\* cited by examiner

300

S301: Process the spinneret plate sample image based on a first image recognition model to obtain annotation state information of each micro hole in the spinneret plate sample image, where the spinneret plate sample image is the projection image formed on the imaging member after the light emitted by the light source passes through each micro hole of the spinneret plate sample and is amplified by the amplifying member, the annotation state information of each micro hole is used to characterize a shape state of each micro hole corresponding thereto S302: Train the preset image recognition model based on the spinneret plate sample image and the annotation state information of each micro hole to obtain the target image recognition model, where the target image recognition model is used to process the spinneret plate projection image to obtain the state information of each micro hole in the spinneret plate

S401: Obtain the spinneret plate projection image on the imaging member

S402: Process the spinneret plate projection image by using the target image recognition model to obtain the state information of each micro hole to be detected in the spinneret plate S403: Determine the detection result of the spinneret plate based on the state information of each micro hole to be detected

FIG. 4

TRAINING METHOD FOR IMAGE RECOGNITION MODEL, SPINNERET PLATE DETECTION METHOD AND APPARATUS

CROSS-REFERENCE TO RELATED APPLICATIONS

The present application claims priority to Chinese Patent Application No. CN202311564507.5, filed with the China National Intellectual Property Administration on Nov. 21, 2023, under 35 U.S.C. § 119 (a) and claims priority to Chinese Patent Application No. CN202323147952.X filed with the China National Intellectual Property Administration on Nov. 21, 2023, under 35 U.S.C. § 119 (a). Each of the above-referenced patent applications is incorporated by reference in its entirety.

TECHNICAL FIELD

The present disclosure relates to the field of computer technology, in particular, to the fields of image recognition and deep learning technologies, specifically, to a training method for an image recognition model, spinneret plate detection method and apparatus.

BACKGROUND

In spinning production process, a spinneret plate transforms polymer melt or solution in a viscous flow state into a fine flow with a specific cross-sectional shape through micro holes, and forms yarn filaments by solidifying through a solidification medium or bath. Particles such as mechanical impurities, gel, carbon fiber, hot cracking and the like in the melt tend to block the micro holes of the spinneret plate, resulting in uneven fiber size of protofilaments, and producing defects such as injector, yarn fineness and yarn fuzz. Therefore, the spinneret plate needs to be detected regularly.

SUMMARY

The present disclosure provides a training method for an image recognition model, and spinneret plate detection method and apparatus, to solve or alleviate one or more technical problems in the prior art.

In a first aspect, the present disclosure provides a training method for an image recognition model including:
  processing a spinneret plate sample image based on a first image recognition model to obtain annotation state information of each micro hole in the spinneret plate sample image, wherein the spinneret plate sample image is a projection image formed on an imaging member after light emitted by a light source passes through each micro hole of a spinneret plate sample and is amplified by an amplifying member, the annotation state information of each micro hole is used to characterize a shape state of each micro hole corresponding thereto; and
  training a preset image recognition model based on the spinneret plate sample image and the annotation state information of each micro hole to obtain a target image recognition model, wherein the target image recognition model is used to process a spinneret plate projection image to obtain state information of each micro hole in a spinneret plate.

In a second aspect, the present disclosure provides a spinneret plate detection method applied to a spinneret plate detection device, which includes a clamping member, a light source, an imaging member and an amplifying member, the clamping member is configured to clamp a spinneret plate, the light source and the imaging member are located on both sides of the clamping member, and the amplifying member is located between the imaging member and the clamping member, light emitted by the light source can pass through each micro hole to be detected of the spinneret plate, be amplified by the amplifying member and then from a spinneret plate projection image on the imaging member, the method includes:
  obtaining the spinneret plate projection image on the imaging member;
  processing the spinneret plate projection image by using a target image recognition model to obtain state information of each micro hole to be detected in the spinneret plate, wherein the target image recognition model is obtained by training based on the training method of any one of above embodiments; and
  determining a detection result of the spinneret plate based on the state information of each micro hole to be detected.

In a third aspect, the present disclosure provides a training apparatus for an image recognition model including:
  a processing unit configured to process a spinneret plate sample image based on a first image recognition model to obtain annotation state information of each micro hole in the spinneret plate sample image, wherein the spinneret plate sample image is a projection image formed on an imaging member after light emitted by a light source passes through each micro hole of a spinneret plate sample and is amplified by an amplifying member, the annotation state information of each micro hole is used to characterize a shape state of each micro hole corresponding thereto; and
  a training unit configured to train a preset image recognition model based on the spinneret plate sample image and the annotation state information of each micro hole to obtain a target image recognition model, wherein the target image recognition model is used to process a spinneret plate projection image to obtain state information of each micro hole in a spinneret plate.

In a fourth aspect, the present disclosure provides a spinneret plate detection apparatus applied to a spinneret plate detection device, which includes a clamping member, a light source, an imaging member and an amplifying member, the clamping member is configured to clamp a spinneret plate, the light source and the imaging member are located on both sides of the clamping member, and the amplifying member is located between the imaging member and the clamping member, light emitted by the light source can pass through each micro hole to be detected of the spinneret plate, be amplified by the amplifying member and then from a spinneret plate projection image on the imaging member, the apparatus includes:
  an obtaining unit configured to obtain the spinneret plate projection image on the imaging member;
  a predicting unit configured to process and predict the spinneret plate projection image by using a target image recognition model to obtain state information of each micro hole to be detected in the spinneret plate, wherein the target image recognition model is obtained by training based on the any one of above training method; and
  a determining unit configured to determine a detection result of the spinneret plate based on the state information of each micro hole to be detected.

In a fifth aspect, the present disclosure provides a spinneret plate detection device including:

at least one processor; and a memory connected in communication with the at least one processor;

where the memory stores an instruction executable by the at least one processor, and the instruction, when executed by the at least one processor, enables the at least one processor to execute the method of any one of embodiments of the present disclosure.

In a sixth aspect, the present disclosure provides a non-transitory computer-readable storage medium storing a computer instruction, wherein the computer instruction is used to cause a computer to execute the method of any one of embodiments of the present disclosure.

The training method for the image recognition model, the spinneret plate detection method and device provided in the embodiments of the present disclosure can automatically detect the state information of each micro hole to be detected of the spinneret plate, so that the detection result of the spinneret plate is determined, no manual detection is required, manpower is saved, and detection efficiency is improved.

It should be understood that contents described in this part is not intended to identify key or important features of the embodiments of the present disclosure, nor is it intended to limit the scope of the present disclosure. The other features of the present disclosure are made easy to understand by the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

FIG. 3 is a flowchart schematic diagram of a training method for an image recognition model provided by another embodiment of the present disclosure.

FIG. 4 is a flowchart schematic diagram of a spinneret plate detection method provided by an embodiment of the present disclosure.

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

In related technologies, detection of a spinneret plate needs to be manually completed, and staff need to check whether each micro hole on the spinneret plate is blocked or cracked. However, due to a large number and small size of micro holes on the spinneret plate, the detection of the spinneret plate is time-consuming and labor-intensive.

To address at least one of the aforementioned issues, the embodiment of the present disclosure provides a training method for an image recognition model, spinneret plate detection method and apparatus, in which annotation state information of each micro hole in a spinneret plate sample image is obtained by processing the spinneret plate sample image based on a first image recognition model, where the spinneret plate sample image is a projection image formed on an imaging member after light emitted by a light source sequentially passes through a spinneret plate sample and an amplifying member in sequence, and the annotation state information of each micro hole is used to characterize a shape state of each micro hole corresponding thereto; a preset image recognition model is trained based on the spinneret plate simple image and the annotation state information of each micro hole, to obtain a target image recognition model, the target image recognition model is used to process a spinneret plate projection image to obtain state information of each micro hole in the spinneret plate. The target image recognition model may automatically detect the state information of each micro hole of the spinneret plate, thereby determining a detection result of the spinneret plate without manual detection, saving manpower, and improving detection efficiency.

The following is an explanation of an implementation of the present disclosure in conjunction with the accompanying drawings.

Figure 1:
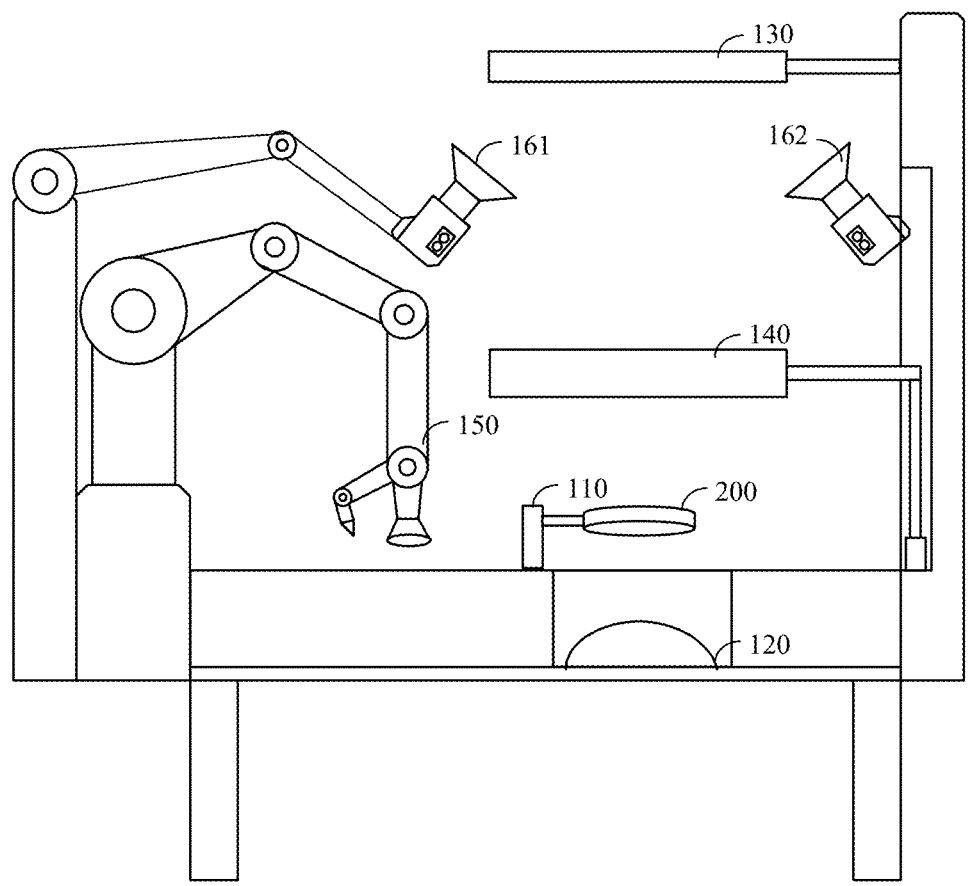
FIG. 1 is a structural schematic diagram of a spinneret plate detection device provided by an embodiment of the present disclosure.
Figure 2:
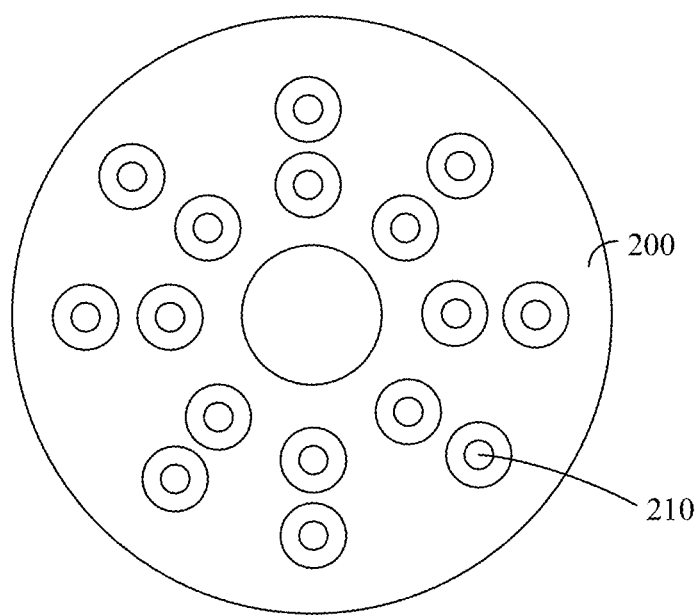
FIG. 2 is a structural schematic diagram of a spinneret plate in FIG. 1.

FIG. 1 is a structural schematic diagram of a spinneret plate detection device provided by an embodiment of the present disclosure; FIG. 2 is a structural schematic diagram of a spinneret plate in FIG. 1.

Referring to FIGS. 1 and 2, the embodiment of the present disclosure provides a spinneret plate detection device. The spinneret plate detection device includes a clamping member 110, a light source 120, an imaging member 130 and an amplifying member 140. The clamping member 110 is used to clamp a spinneret plate 200, the light source 120 and the imaging member 130 are located on both sides of the clamping member 110, and the amplifying member 140 is located between the imaging member 130 and the clamping member 110. Light emitted by the light source 120 can pass through each micro hole to be detected 210 of the spinneret plate 200, be amplified by the amplifying member 140 and then from a spinneret plate projection image on the imaging member 130.

It may be understood that the spinneret plate 200 may have a plurality of micro holes, abbreviated as micro holes. The micro holes of the spinneret plate to be detected are called micro holes to be detected 210. Shapes of the micro holes to be detected 210 may be a circular shape, a triangular shape, a cross shape, a straight line shape, a caterpillar shape, and other shapes.

Due to in a spinning production process, a spinneret plate transforms polymer melt or solution in a viscous flow state into a fine flow with a specific cross-sectional shape through micro holes and forms yarn filaments by solidifying through a solidification medium or bath, particles such as mechanical impurities, gel, carbon fiber, hot cracking and the like in the melt tend to block the micro holes of the spinneret plate (resulting in irregular shape and reduced area of the micro holes), or cause cracking of the micro holes (irregular shape and expanded area of the micro holes) and other problems, which will lead to changes in the shape of the micro holes, which will affect quality of formed fiber yarns.

Main types of the fiber yarns involved in the embodiment of the present disclosure herein may include one or more types of Partially Oriented Yarns (POY), Fully Drawn Yarns (FDY), Polyester Staple Fibers, etc. For example, specific types of yarns may include Polyester Partially Oriented Yarns, Polyester Fully Drawn Yarns, Polyester Drawn Yarns, Polyester Staple Fiber, etc.

The clamping member 110 of the spinneret plate detection device may be used to clamp or fix the spinneret plate, and may be a structure such as a clamping jaw.

The light source 120 is a structure that can emit a light beam, for example, may be a light emitting diode or the like. In some embodiments, the light source 120 may emit parallel light, a diameter of the light source may be larger than a diameter of the spinneret plate, and centerlines of both may be overlapped.

The amplifying member 140 may be a common device that can achieve amplification of an optical signal, such as a convex lens or other structures.

The imaging member 130 may be a structure such as a screen that can present an image, and may be perpendicular to an axis of the light emitted by the light source.

The light emitted by the light source 120 may pass through the spinneret plate 200. It can be understood that the light may pass through the micro holes to be detected 210 of the spinneret plate 200 to form imaging beams. The imaging beams may be amplified by the amplifying member 140 and then irradiated onto the imaging member 130 for imaging, so that the shape of each micro hole to be detected may be amplified and projected onto the imaging member 130. When using the spinneret plate detection device to detect a spinneret plate sample, the projection image on the imaging member 130 may be used as a spinneret plate sample image, and may train a preset image recognition model to obtain a target image recognition model that can accurately output state information of each micro hole to be detected in the spinneret plate.

The following is an explanation of a training method for an image recognition model. FIG. 3 is a flowchart schematic diagram of the training method for the image recognition model provided by another embodiment of the present disclosure. Refer to FIG. 3, the embodiment of the present disclosure also provides a training method 300 for the image recognition model, which includes steps S301 to S302 as follows.

In the step S301, the spinneret plate sample image is processed based on a first image recognition model to obtain annotation state information of each micro hole in the spinneret plate sample image, where the spinneret plate sample image is the projection image formed on the imaging member after the light emitted by the light source passes through each micro hole of the spinneret plate sample and is amplified by the amplifying member, the annotation state information of each micro hole is used to characterize a shape state of each micro hole corresponding thereto.

In the step S302, the preset image recognition model is trained based on the spinneret plate sample image and the annotation state information of each micro hole to obtain the target image recognition model, where the target image recognition model is used to process the spinneret plate projection image to obtain the state information of each micro hole in the spinneret plate.

The spinneret plate sample image may be a projection image of the spinneret plate obtained through the above spinneret plate detection apparatus, the projection image includes the shape of each micro hole in the spinneret plate sample, since the micro holes are usually small in size, if the spinneret plate image is directly used as a sample image, sample quality is poor, and accuracy of a model obtained by final training is easily affected. The spinneret plate projection image in the present embodiment has been amplified by the amplifying member, which may improve the sample quality, thereby improving accuracy of the target image recognition model.

The first image recognition model may be an image recognition model, an object detection model, or an image segmentation model, for example, it may be a Segment Anything (SA) model, or it may also be a YOLOv8 (you only look once version8) model. These models may be used to quickly recognize the micro holes in the image and the annotation state information of the micro holes, and the annotation state information of the micro holes may be used to characterize the shape states of the micro holes. Taking micro holes in circular shape as an example, the annotation state information thereof may be a perfectly circular shape, and taking blocked or cracked micro holes as an example, the annotation state information thereof may be a non-perfectly circular shape. Of course, the micro holes can also be in other shapes, and so on.

It can be understood that the first image recognition model may be a model that has been trained in related technologies, which may accurately obtain the annotation state information of micro holes.

The step S301 may input the spinneret plate sample image into the first image recognition model, thereby obtaining the annotation state information of each micro hole.

Through the first image recognition model, the annotation state information of each micro hole in the spinneret plate sample image may be quickly obtained, and manual annotation is not required.

The step S302 may train the preset image recognition model by using the spinneret plate sample image and the annotation state information, thereby obtaining an image recognition model that has been trained, that is, the target image recognition model.

It can be understood that the target image recognition model may be used to process the spinneret plate projection image obtained by using the spinneret plate detection device, thereby obtaining the state information of each micro hole, and then it may detect whether the spinneret plate is qualified, and this process does not need manual detection, saves time and effort, and detection efficiency and accuracy are higher.

In some embodiments, in the step S301, processing the spinneret plate sample image based on the first image recognition model to obtain the annotation state information of each micro hole in the spinneret plate sample image includes the following steps:

inputting the spinneret plate sample image into a first sub model in the first image recognition model to obtain a first information set of each micro hole, where the first information set includes first state information of each micro hole, first position information of each micro hole, and a first confidence level corresponding to the first state information of each micro hole;

inputting the spinneret plate sample image into a second sub model in the first image recognition model to obtain a second information set of each micro hole, where the second information set includes second state information of each micro hole, second position information of each micro hole, and a second confidence level corresponding to the second state information of each micro hole; and determining the annotation state information of each micro hole based on the first information set and the second information set.

In the present embodiment, the first image recognition model may include two sub models, for example, the first and second sub models, which may be different models.

The first sub model is used to process the spinneret plate sample image to obtain the first information set, which may include the first state information, the first position information and the first confidence level of each micro hole.

Where the first state information is used to characterize the shape state of the micro hole, and the first position information is a position of the micro hole in the spinneret plate sample image. It can be understood that each micro hole may be distinguished through the first position information since an amount of the micro holes in the spinneret plate is large. The first confidence level is a probability of the first state information, and if the first state information is the perfectly circular shape, the first confidence level is a probability of the perfectly circular shape.

Similarly, the second sub model is used to process the spinneret plate sample image to obtain the second information set, which may include the second state information, the second position information and the second confidence level of each micro hole.

Where the second state information is used to characterize the shape state of the micro hole, and the second position information is the position of the micro hole in the spinneret plate sample image. It can be understood that each micro hole may be distinguished through the second position information since the amount of the micro holes in the spinneret plate is large. The second confidence level is a probability of the second state information, and if the second state information is the perfectly circular shape, the second confidence level is a probability of the perfectly circular shape.

The annotation state information of each micro hole may be obtained based on the first information set and the second information set.

It can be understood that accuracy of the annotation state information may be improved by recognizing the spinneret plate sample images through different models and then synthesizing the annotation state information of each micro hole according to results of the two models, so as to improve the sample quality.

In an embodiment, the first sub model may be for example the SA model, may obtain a higher accuracy of the first information set. The second sub model may be for example the YOLOv8 model, may obtain the second information set more quickly.

In other embodiments, the first image recognition model may be a model that is capable of outputting the annotation state information of micro holes and is obtained by training using manually annotated samples.

In some embodiments, determining the annotation state information of each micro hole based on the first information set and the second information set includes:

determining a state information subset of each micro hole based on the first position information in the first information set and the second position information in the second information set, where the state information subset includes the first state information and the second state information of the same micro hole;

for the state information subset of a first micro hole of the micro holes, determining a comprehensive confidence level of the first micro hole based on the first confidence level corresponding to the first state information of the first micro hole and the second confidence level corresponding to the second state information of the first micro hole, in a case where the first state information does not match the second state information;

determining the annotation state information of the first micro hole based on the comprehensive confidence level of the first micro hole and a confidence threshold; and determining the annotation state information of each micro hole at least based on the annotation status information of the first micro hole.

It can be understood that since both the first sub model and the second sub model process the spinneret plate sample image, the position information obtained by the two models may be located in the same coordinate system.

By matching the first position information of the micro hole with the second position information of the micro hole, it may be determined whether the two micro holes belong to the same micro hole, and if the two micro holes belong to the same micro hole, the first state information and the second state information of the micro hole may be added to the state information subset of the micro hole, so that one state information subset may be determined for each micro hole.

Meanwhile, taking the first micro hole of the micro holes as an example, in the state information subset of the first micro hole, if the first state information and the second state information of the first micro hole match each other (meanings of the both are the same), the first state information is taken as the annotation state information of the first micro hole. If the first state information and the second state information of the first micro hole do not match (the meanings of the both are different, for example, one is the perfectly circular shape and the other one is the non-perfectly circular shape), the first confidence level and the second confidence level of the first micro hole may be obtained, and then the comprehensive confidence level of the first micro hole may be determined according to the first confidence level and the second confidence level.

For example, the first confidence level shows that a probability that the first micro hole is the perfectly circular shape is 85%, and the second confidence level shows that a probability that the first micro hole is the non-perfectly circular shape is 65%, and the probability that the first micro hole is the perfectly circular shape is 35%, by using 1-65%=35%, and then based on the probabilities 85% and 35%, the comprehensive confidence level of the first micro hole may be obtained by a way of power addition, and the comprehensive confidence level determines a comprehensive probability that the first micro hole is the perfectly circular shape. This manner comprehensively considers each confidence level, and the comprehensive confidence level obtained is more accurate. Then, the comprehensive confidence level threshold is compared with the confidence threshold to determine final state information of the first micro hole, that is, the annotation state information.

By performing the above processes on each micro hole, the annotation state information of each micro hole may be obtained. In the present embodiment, when the first state information and the second state information do not match, a more accurate annotation state information may be obtained by determining the comprehensive confidence level, which is conducive to improving the sample quality and improving accuracy of the model that has been trained.

In some embodiments, in the step S302, training the preset image recognition model based on the spinneret plate sample image and the annotation state information of each micro hole to obtain the target image recognition model includes:

obtaining prediction state information of each micro hole by processing the spinneret plate sample image based on the preset image recognition model;

determining a first loss function based on the prediction state information of each micro hole and the annotation state information of each micro hole;

adding a temperature scalar to the first loss function to obtain a second loss function, where the temperature scalar is used to balance a sensitivity of the preset image detection model to a difference between micro holes in different shape states; and adjusting a parameter of the preset image recognition model based on the second loss function to obtain the target image recognition model.

The present embodiment may input the spinneret plate sample image into the preset image recognition model to obtain the prediction state information of each micro hole, that is, a prediction shape state of each micro hole.

Then, the first loss function may be determined based on the prediction state information and annotated state information of each micro hole.

The temperature scalar is used to adjust a temperature parameter in the first loss function to balance the sensitivity of the preset image detection model to the difference between the micro holes in different shape categories, and to improve accuracy of classification and recognition. The temperature parameter refers to a parameter used to control a relative distance between the categories.

In the present embodiment, the first loss function may be implemented using the following formula:

$$\text{loss}_1(x, y) = -\frac{1}{N}\sum_i^N \log\left(\frac{e^{f(x_i,y_i)}}{\sum_y e^{f(x_i,y)}}\right).$$

Where, $\text{loss}_1(x, y)$ represents the first loss function, $x_i$ represents prediction state information of an i-th spinneret plate sample image, that is, prediction state information of each micro hole in the i-th spinneret plate sample image, x represents a set $x=\{x_1, x_2, \ldots, x_N\}$ of the prediction state information of each micro hole in each spinneret plate sample image. $y_i$ represents annotation state information of the i-th spinneret plate sample image, that is, annotation state information of each micro hole in the i-th spinneret plate sample image, and y represents a set $y=\{y_1, y_2, \ldots, y_N\}$ of the annotation state information of each micro hole in each spinneret plate sample image, $f(x_i, y_i)$ represents a confidence level of the prediction state information of the i-th spinneret plate sample image, $f(x_i, y)$ represents a confidence level of the annotation state information of the i-th spinneret plate sample image, N represents an amount of spinneret plate sample images, and i is an integer greater than or equal to 1 and less than or equal to N.

The second loss function $\text{loss}_2(x, y; w)$ obtained by adding the temperature scalar w to the first loss function $\text{loss}_1(x, y)$, that is adding the temperature scalar w to the second loss function as an adjustable variable in the second loss function, may be implemented using the following formula:

$$\text{loss}_2(x, y; w) = -\frac{1}{N}\sum_i^N \log\left(\frac{e^{f(x_i,y_i)/w}}{\sum_y e^{f(x_i,y)/w}}\right).$$

The parameter of the preset image recognition model may be adjusted through the second loss function of the above embodiment, thereby obtaining the target loss function. The temperature scalar may increase flexibility of the loss function, which is beneficial for further improving performance of the model.

In some embodiments, adding the temperature scalar to the first loss function to obtain the second loss function includes:

determining a dynamic temperature function, which is used to characterize a changing relationship of the temperature scalar over time, based on the temperature scalar; and adding the dynamic temperature function to the first loss function to obtain the second loss function.

In the present embodiment, a dynamic temperature function $f_w(t)$ and $f_w(t)=e^{(at^2+bt+c)}$ may also be introduced through the temperature scalar w, where w=(a,b,c) is a triplet of polynomial coefficients, a,b,c may be the polynomial coefficients, and t represents a normalized fine-tuning iteration index, which is positively correlated with time, which may be greater than or equal to 0 and less than or equal to 1.

The second loss function $\text{loss}_2(x, y; w)$ that may be obtained by adding the dynamic temperature function to the first loss function is:

$$\text{loss}_2(x, y; w) = -\frac{1}{N}\sum_i^N \log\left(\frac{e^{\partial(y_i)f(x_i,y_i)/f_w(t)}}{\sum_y e^{\partial(y)f(x_i,y)/f_w(t)}}\right).$$

Where $\partial(y_i)$ is a classification scaling factor corresponding to $y_i$, and $\partial(y)$ is a classification scaling factor corresponding to y.

Since the temperature may increase or decrease over time, the second loss function with the dynamic temperature function may make a prediction distribution smoother or sharper, thereby helping to achieve convergence of the second loss function.

In some embodiments, determining the first loss function based on the prediction state information of each micro hole and the annotation state information of each micro hole includes determining the first loss function based on the prediction state information of each micro hole, the annotation state information of each micro hole and a loss function of the first image recognition model.

In the present embodiment, the first loss function may also be obtained by combining the loss function of the first image recognition model, for example, the loss function of the first image recognition model is taken as a reference term of the first loss function, so that the first loss function may be obtained by referring to the first image recognition model, so as to simplify a process of determining the loss function.

FIG. 4 is a flowchart schematic diagram of a spinneret plate detection method provided by an embodiment of the present disclosure. Referring to FIGS. 1, 2 and 4, the embodiment of the present disclosure provides a spinneret plate detection method 400 applied to the spinneret plate detection device. The spinneret plate detection device includes the clamping member 110, the light source 120, the imaging member 130 and the amplifying member 140. The clamping member 110 is used to clamp the spinneret plate 200, the light source 120 and the imaging member 130 are located on both sides of the clamping member 110, and the amplifying member 140 is located between the imaging member 130 and the clamping member 110. The light emitted by the light source 120 can pass through each micro hole to be detected 210 of the spinneret plate 200, be amplified by the amplifying member 140 and then from the spinneret plate projection image on the imaging member 130. The method 400 includes steps S401 to S403.

In the step S401, the spinneret plate projection image on the imaging member is obtained.

In the step S402, the spinneret plate projection image is processed by using the target image recognition model to obtain the state information of each micro hole to be detected in the spinneret plate, where the target image recognition model is obtained by training based on any training method as described above.

In the step S403, the detection result of the spinneret plate is determined based on the state information of each micro hole to be detected.

A structure of the spinneret plate detection apparatus may refer to descriptions to the embodiments as described above and is not repeated any more. In the step S401, the spinneret plate projection image may be obtained by capturing a projection image on the imaging member through a capturing member such as a camera in the spinneret plate detection apparatus.

Then, the target image recognition model that has been trained may be used to process the spinneret plate projection image, and the target image recognition model is trained by the training method as described above, and may output the state information of each micro hole to be detected in the spinneret plate, that is, the shape state of each micro hole to be detected.

The step S403 may obtain the detection result of the spinneret plate based on the state information of each micro hole to be detected.

It can be understood that the detection method provided in the present embodiment may process the spinneret plate projection image by using the target image recognition model, so as to obtain the state information of each micro hole to be detected, and then it may detect whether the spinneret plate qualified, which does not need manual detection, saves time and effort, and the detection efficiency and accuracy are higher.

In some embodiments, in the step S403, determining the detection result of the spinneret plate based on the state information of each micro hole to be detected may include:

determining a pass percent of the micro holes based on the state information of each micro hole to be detected, where the pass percent of the micro holes is a ratio of an amount of micro holes to be detected whose state information matches a preset state to a total amount of micro holes to be detected; and determining the detection result of the spinneret plate based on the pass percent of the micro holes and a pass percent threshold.

The preset state may be a standard state of the micro holes to be detected, i.e., a shape of a micro hole to be detected that is neither blocked nor cracked. Through the state information of each micro hole to be detected, it may determine the amount of the micro holes to be detected that match the preset state, that is, an amount of the micro holes to be detected have not changed in shape. The pass percent of the micro holes may be obtained by dividing this amount by the total amount of the micro holes to be detected.

The pass percent threshold may be set according to an actual situation, for example, it may be 1, also may be 0.98, or the like, and may be set according to the situation. If the pass percent threshold is selected as 1, it means that all the micro holes to be detected have not changed in shape, which means that the spinneret plate is qualified, rather, the spinneret plate is a substandard product that needs to be cleaned or replaced.

In some embodiments, the method 400 further includes controlling a mechanical arm in the spinneret plate detection device to move the spinneret plate to a first area for placing qualified spinneret plates, in a case where the detection result satisfies a preset qualification condition.

Referring to FIG. 1, the spinneret plate detection device may also be provided with the mechanical arm 150, and the mechanical arm 150 may be a common structure that can realize multi-degree of freedom movement.

That the detection result satisfies the preset qualification condition may be that the pass percent of the micro holes is greater than or equal to the pass percent threshold. Under this condition, the spinneret plate may also be moved to the first area by the mechanical arm 150, and the first area may be a storing area of the qualified spinneret plates.

Moving the spinneret plate through the mechanical arm may classify the spinneret plate while detecting the spinneret plate, which further simplifies labor cost.

In some embodiments, the method 400 further includes:

controlling the mechanical arm in the spinneret plate detection device to move the spinneret plate to a second area for placing unqualified spinneret plates, in a case where the detection result does not satisfy the preset qualification condition; and sending a first notification for characterizing disqualification of the spinneret plate, the first notification includes a serial number of the spinneret plate.

In the case where the detection result does not satisfy the preset qualification condition, the spinneret plate be moved to the second area by the mechanical arm 150, and the second area may be a storing area of the unqualified spinneret plates, so that a staff may be convenient to clean these spinneret plates in time, and the like.

In addition, while being moved to the second area, the first notification may also be sent to the staff to notify the staff that there is an unqualified spinneret plate in the second area, and simultaneously, the first notification may also include information such as the serial number of the spinneret plate, so as to facilitate management for the spinneret plate.

In some embodiments, referring to FIG. 1, and the spinneret plate detection device includes a first capturing member 161 and a second capturing member 162, and the first capturing member 161 and the second capturing member 162 are respectively positioned at two sides of a central axis of the imaging member 130.

In the step S401, obtaining the spinneret plate projection image on the imaging member includes:

controlling the first capturing member to capture a first projection image on the imaging member;

controlling the second capturing member to capture a second projection image on the imaging member, where the first projection image and the second projection image are projection images of the same spinneret plate; and determining the spinneret plate projection image based on the first projection image and the second projection image.

In the present embodiment, the spinneret plate detection apparatus may include two capturing members, and the two capturing members may be respectively located on two sides, such as left and right sides, of the imaging member 130, so that the spinneret plate projection image on the imaging member 130 may be captured from different angles.

The spinneret plate projection image may be obtained by obtaining the first projection image on the imaging member through the first capturing member and obtaining the second projection image on the imaging member through the second capturing member, respectively. The first projection image and the second projection image are projected images at different angles of the same spinneret plate.

Then spinneret plate projection image may be obtained based on the first projection image and the second projection image, so that accuracy of the spinneret plate projection image may be improved based on the projection images of different angles.

In some embodiments, determining the spinneret plate projection image based on the first projection image and the second projection image includes:

performing perspectivity correction on the first projection image to obtain a first correction image;

performing the perspectivity correction on the second projection image to obtain a second correction image; and fusing the first correction image and the second correction image to obtain the spinneret plate projection image.

It can be understood that since the first projection image and the second projection image are respectively located on both sides of the central axis of the imaging member, the first projection image and the second projection image may produce a certain deformation due to angles of view, and the projection image may be processed separately through the perspectivity correction first, so that the first correction image and the second correction image may be obtained. The first correction image and the second correction image may have the same angle of view as an orthographic projection image of the spinneret plate on the imaging member 130.

Then the first correction image and the second correction image may be fused, for example, edges of projections presented by the two correction images are superimposed, so as to improve clarity and accuracy of the spinneret plate projection image, which is conducive to improving the accuracy of the detection result.

Figure 5:
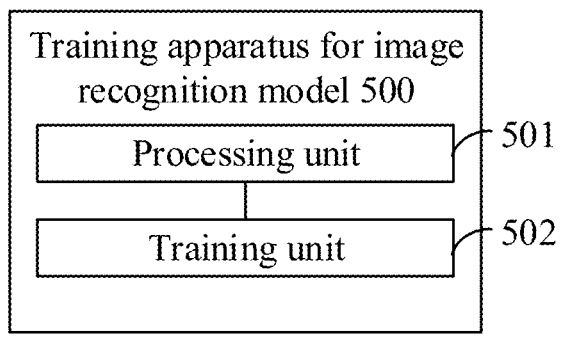
FIG. 5 is a schematic block diagram of a training apparatus for an image recognition model provided by an embodiment of the present disclosure.

FIG. 5 is a schematic block diagram of a training apparatus for an image recognition model provided by an embodiment of the present disclosure. Referring to FIG. 5, the embodiment of the present disclosure provides a training apparatus 500 for the image recognition model, which includes:

a processing unit 501 configured to process the spinneret plate sample image based on the first image recognition model to obtain the annotation state information of each micro hole in the spinneret plate sample image, where the spinneret plate sample image is the projection image formed on the imaging member after the light emitted by the light source passes through each micro hole of the spinneret plate sample and is amplified by the amplifying member, the annotation state information of each micro hole is used to characterize the shape state of a micro hole corresponding thereto; and a training unit 502 configured to train the preset image recognition model based on the spinneret plate sample image and the annotation state information of each micro hole to obtain the target image recognition model, where the target image recognition model is used to process the spinneret plate projection image to obtain the state information of each micro hole in the spinneret plate.

In some embodiments, the processing unit 501 is further configured to:

input the spinneret plate sample image into the first sub model in the first image recognition model to obtain the first information set of each micro hole, where the first information set includes the first state information of each micro hole, the first position information of each micro hole, and the first confidence level corresponding to the first state information of each micro hole;

input the spinneret plate sample image into the second sub model in the first image recognition model to obtain the second information set of each micro hole, where the second information set includes the second state information of each micro hole, the second position information of each micro hole, and the second confidence level corresponding to the second state information of each micro hole; and determine the annotation state information of each micro hole based on the first information set and the second information set.

In some embodiments, the processing unit 501 is further configured to:

determine the state information subset of each micro hole based on the first position information in the first information set and the second position information in the second information set, where the state information subset includes the first state information and the second state information of the same micro hole;

for the state information subset of the first micro hole of the micro holes, determine the comprehensive confidence level of the first micro hole based on the first confidence level corresponding to the first state information of the first micro hole and the second confidence level corresponding to the second state information of the first micro hole, in the case where the first state information does not match the second state information;

determine the annotation state information of the first micro hole based on the comprehensive confidence level of the first micro hole and the confidence threshold; and determine the annotation state information of each micro hole at least based on the annotation status information of the first micro hole.

In some embodiments, the training unit 502 is further configured to:

obtain the prediction state information of each micro hole by processing the spinneret plate sample image based on the preset image recognition model;

determine the first loss function based on the prediction state information of each micro hole and the annotation state information of each micro hole;

add the temperature scalar to the first loss function to obtain the second loss function, where the temperature scalar is used to balance the sensitivity of the preset image detection model to the difference between the micro holes in different shape states; and adjust the parameter of the preset image recognition model based on the second loss function to obtain the target image recognition model.

In some embodiments, the training unit 502 is further configured to:

determine the dynamic temperature function, which is used to characterize the changing relationship of the temperature scalar over time, based on the temperature scalar; and add the dynamic temperature function to the first loss function to obtain the second loss function.

In some embodiments, the training unit 502 is further configured to:

determining the first loss function based on the prediction state information of each micro hole, the annotation state information of each micro hole and the loss function of the first image recognition model.

Figure 6:
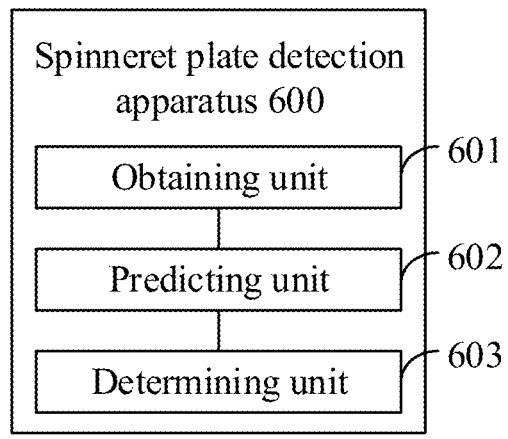
FIG. 6 is a block diagram of a spinneret plate detection apparatus provided by another embodiment of the present disclosure.

FIG. 6 is a block diagram of a spinneret plate detection apparatus provided by another embodiment of the present disclosure. Referring to FIG. 6, the embodiment of the present disclosure provides a spinneret plate detection apparatus 600 applied to the spinneret plate detection device. The spinneret plate detection device includes the clamping member 110, the light source 120, the imaging member 130 and the amplifying member 140. The clamping member 110 is used to clamp the spinneret plate, the light source 120 and the imaging member 130 are located on both sides of the clamping member 110, and the amplifying member 140 is located between the imaging member 130 and the clamping member 110. The light emitted by the light source 120 can pass through each micro hole to be detected 210 of the spinneret plate 200, be amplified by the amplifying member 140 and then from the spinneret plate projection image on the imaging member 130. The apparatus 600 includes:

an obtaining unit 601 configured to obtain the spinneret plate projection image on the imaging member;

a predicting unit 602 configured to process and predict the spinneret plate projection image by using the target image recognition model to obtain the state information of each micro hole to be detected in the spinneret plate, where the target image recognition model is obtained based on any training method as described above; and a determining unit 603 configured to determine the detection result of the spinneret plate based on the state information of each micro hole to be detected.

In some embodiments, the determining unit 603 is further configured to:

control the mechanical arm in the spinneret plate detection device to move the spinneret plate to the first area for placing the qualified spinneret plates, in the case where the detection result satisfies the preset qualification condition.

In some embodiments, the determining unit 603 is further configured to:

control the mechanical arm in the spinneret plate detection device to move the spinneret plate to the second area for placing unqualified spinneret plates, in the case where the detection result does not satisfy the preset qualification condition; and send the first notification for characterizing the disqualification of the spinneret plate, the first notification includes the serial number of the spinneret plate.

In some embodiments, the spinneret plate detection device includes the first capturing member and the capturing camera member that are respectively positioned at two sides of the central axis of the imaging member.

The obtaining unit 601 is further configured to:

control the first capturing member to capture the first projection image on the imaging member;

control the second capturing member to capture the second projection image on the imaging member, where the first projection image and the second projection image are the projection images of the same spinneret plate; and determine the spinneret plate projection image based on the first projection image and the second projection image.

In some embodiments, the obtaining unit 601 is further configured to:

perform the perspectivity correction on the first projection image to obtain the first correction image;

perform the perspectivity correction on the second projection image to obtain the second correction image; and fuse the first correction image and the second correction image to obtain the spinneret plate projection image.

In some embodiments, the determining unit 603 is further configured to:

determine the pass percent of the micro holes based on the state information of each micro hole to be detected, where the pass percent of the micro holes is the ratio of the amount of micro holes to be detected whose state information matches the preset state to the total amount of micro holes to be detected; and determine the detection result of the spinneret plate based on the pass percent of the micro holes and the pass percent threshold.

Descriptions to the specific functions and examples of each module and submodule of the apparatus of the present embodiment may refer to relevant descriptions of the corresponding steps in the above method embodiments, and will not be repeated herein.

The embodiment of the present disclosure provides a spinneret plate detection device including:

at least one processer; and a memory in a communication connection with the at least one processor;

where the memory stores an instruction executable by the at least one processor, and the instruction, when executed by the at least one processor, enables the at least one processor to execute the method of any one of the above embodiments.

The embodiment of the present disclosure provides a non-transitory computer-readable storage medium storing a computer instruction, where the computer instruction is configured to causes a computer to execute the method of any one of the above embodiments.

Figure 7:
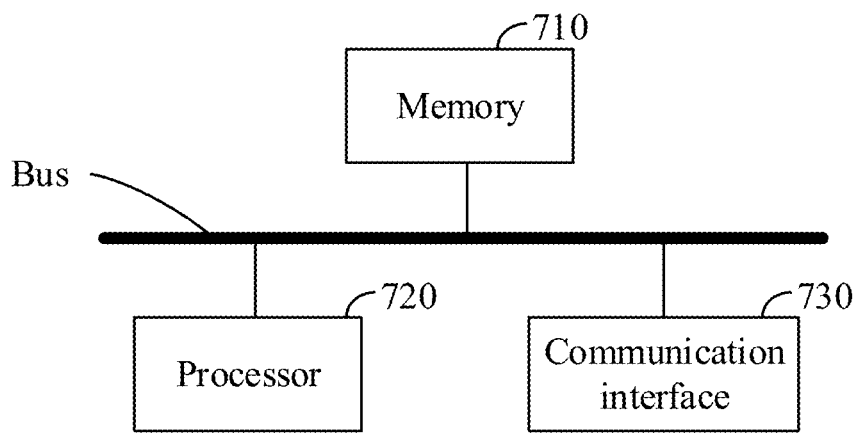
FIG. 7 is a block diagram of a spinneret plate detection device for implementing a training method for an image recognition model or a spinneret plate detection method according to an embodiment of the present disclosure.

FIG. 7 is a block diagram of a spinneret plate detection device for implementing a training method for an image recognition model or a spinneret plate detection method according to an embodiment of the present disclosure. As shown in FIG. 7, the spinneret plate detection device includes: a memory 710 and a processor 720, the memory 710 stores a computer program that can run on the processor 720. There may be one or more memories 710 and processors 720. The memory 710 may store one or more computer programs, which when executed by the spinneret plate detection device, cause the spinneret plate detection device to perform the method provided in the above method embodiment. The spinneret plate detection device may also include: a communication interface 730 configured to communicate with an external device for data interactive transmission.

If the memory 710, the processor 720 and the communication interface 730 are implemented independently, the memory 710, the processor 720 and the communication interface 730 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For case of representation, the bus is represented by only one thick line in FIG. 7, but this thick line does not represent only one bus or only one type of bus.

Optionally, in a specific implementation, if the memory 710, the processor 720 and the communication interface 730 are integrated on one chip, the memory 710, the processor 720 and the communication interface 730 may communicate with each other through an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A training method for an image recognition model, comprising:
   processing a spinneret plate sample image based on a first image recognition model to obtain annotation state information of each micro hole in the spinneret plate sample image, wherein the spinneret plate sample image is a projection image formed on an imaging member after light emitted by a light source passes through each micro hole of a spinneret plate sample and is amplified by an amplifying member, the annotation state information of each micro hole is used to characterize a shape state of each micro hole corresponding thereto; and training a preset image recognition model based on the spinneret plate sample image and the annotation state information of each micro hole to obtain a target image recognition model, wherein the target image recognition model is used to process a spinneret plate projection image to obtain state information of each micro hole in a spinneret plate;

wherein processing the spinneret plate sample image based on the first image recognition model to obtain the annotation state information of each micro hole in the spinneret plate sample image comprises:

inputting the spinneret plate sample image into a first sub model in the first image recognition model to obtain a first information set of each micro hole, wherein the first information set comprises first state information of each micro hole, first position information of each micro hole, and a first confidence level corresponding to the first state information of each micro hole;

inputting the spinneret plate sample image into a second sub model in the first image recognition model to obtain a second information set of each micro hole, wherein the second information set comprises second state information of each micro hole, second position information of each micro hole, and a second confidence level corresponding to the second state information of each micro hole; and determining the annotation state information of each micro hole based on the first information set and the second information set.

2. The method of claim 1, wherein determining the annotation state information of each micro hole based on the first information set and the second information set comprises:

determining a state information subset of each micro hole based on the first position information in the first information set and the second position information in the second information set, wherein the state information subset comprises the first state information and the second state information of a same micro hole;

for the state information subset of a first micro hole of micro holes, determining a comprehensive confidence level of the first micro hole based on the first confidence level corresponding to the first state information of the first micro hole and the second confidence level corresponding to the second state information of the first micro hole, in a case where the first state information of the first micro hole does not match the second state information of the first micro hole;

determining the annotation state information of the first micro hole based on the comprehensive confidence level of the first micro hole and a confidence threshold; and determining the annotation state information of each micro hole at least based on the annotation status information of the first micro hole.

3. The method of claim 1, wherein training the preset image recognition model based on the spinneret plate sample image and the annotation state information of each micro hole to obtain the target image recognition model comprises:

obtaining prediction state information of each micro hole by processing the spinneret plate sample image based on the preset image recognition model;

determining a first loss function based on the prediction state information of each micro hole and the annotation state information of each micro hole;

adding a temperature scalar to the first loss function to obtain a second loss function, wherein the temperature scalar is used to balance a sensitivity of the preset image recognition model to a difference between micro holes in different shape states; and adjusting a parameter of the preset image recognition model based on the second loss function to obtain the target image recognition model.

4. The method of claim 3, wherein adding the temperature scalar to the first loss function to obtain the second loss function comprises:

determining a dynamic temperature function, which is used to characterize a changing relationship of the temperature scalar over time, based on the temperature scalar; and adding the dynamic temperature function to the first loss function to obtain the second loss function.

5. The method of claim 3, wherein determining the first loss function based on the prediction state information of each micro hole and the annotation state information of each micro hole comprises:

determining the first loss function based on the prediction state information of each micro hole, the annotation state information of each micro hole and a loss function of the first image recognition model.

6. A spinneret plate detection method applied to a spinneret plate detection device, which comprises a clamping member, a light source, an imaging member and an amplifying member, the clamping member is configured to clamp a spinneret plate, the light source and the imaging member are located on both sides of the clamping member, and the amplifying member is located between the imaging member and the clamping member, light emitted by the light source can pass through each micro hole to be detected of the spinneret plate, be amplified by the amplifying member and then from a spinneret plate projection image on the imaging member, the method comprises:

obtaining the spinneret plate projection image on the imaging member;

processing the spinneret plate projection image by using a target image recognition model to obtain state information of each micro hole to be detected in the spinneret plate, wherein the target image recognition model is obtained by training based on the training method of claim 1; and determining a detection result of the spinneret plate based on the state information of each micro hole to be detected.

7. The method of claim 6, further comprising:

controlling a mechanical arm in the spinneret plate detection device to move the spinneret plate to a first area for placing qualified spinneret plates, in a case where the detection result satisfies a preset qualification condition.

8. The method of claim 6, further comprising:

controlling a mechanical arm in the spinneret plate detection device to move the spinneret plate to a second area for placing unqualified spinneret plates, in a case where the detection result does not satisfy a preset qualification condition; and sending a first notification for characterizing disqualification of the spinneret plate, wherein the first notification comprises a serial number of the spinneret plate.

9. The method of claim 6, wherein the spinneret plate detection device comprises a first capturing member and a second capturing member that are respectively positioned at two sides of a central axis of the imaging member.

10. The method of claim 9, wherein obtaining the spinneret plate projection image on the imaging member comprises:
controlling the first capturing member to capture a first projection image on the imaging member;
controlling the second capturing member to capture a second projection image on the imaging member, wherein the first projection image and the second projection image are projection images of the same spinneret plate; and
determining the spinneret plate projection image based on the first projection image and the second projection image.

11. The method of claim 10, wherein determining the spinneret plate projection image based on the first projection image and the second projection image comprises:
performing perspectivity correction on the first projection image to obtain a first correction image;
performing the perspectivity correction on the second projection image to obtain a second correction image; and
fusing the first correction image and the second correction image to obtain the spinneret plate projection image.

12. The method of claim 6, wherein determining the detection result of the spinneret plate based on the state information of each micro hole to be detected comprises:
determining a pass percent of micro holes based on the state information of each micro hole to be detected, wherein the pass percent of micro holes is a ratio of an amount of micro holes to be detected whose state information matches a preset state to a total amount of micro holes to be detected; and
determining the detection result of the spinneret plate based on the pass percent of micro holes and a pass percent threshold.

13. A spinneret plate detection device, comprising:
at least one processor; and
a memory connected in communication with the at least one processor;
wherein the memory stores an instruction executable by the at least one processor, and the instruction, when executed by the at least one processor, enables the at least one processor to execute the method of claim 1.

14. A spinneret plate detection device, comprising:
at least one processor; and
a memory connected in communication with the at least one processor;
wherein the memory stores an instruction executable by the at least one processor, and the instruction, when executed by the at least one processor, enables the at least one processor to execute the method of claim 6.

15. A non-transitory computer-readable storage medium storing a computer instruction, wherein the computer instruction is used to cause a computer to execute the method of claim 1.

16. A non-transitory computer-readable storage medium storing a computer instruction, wherein the computer instruction is used to cause a computer to execute the method of claim 6.

* * * * *